Patented Dec. 11, 1923.

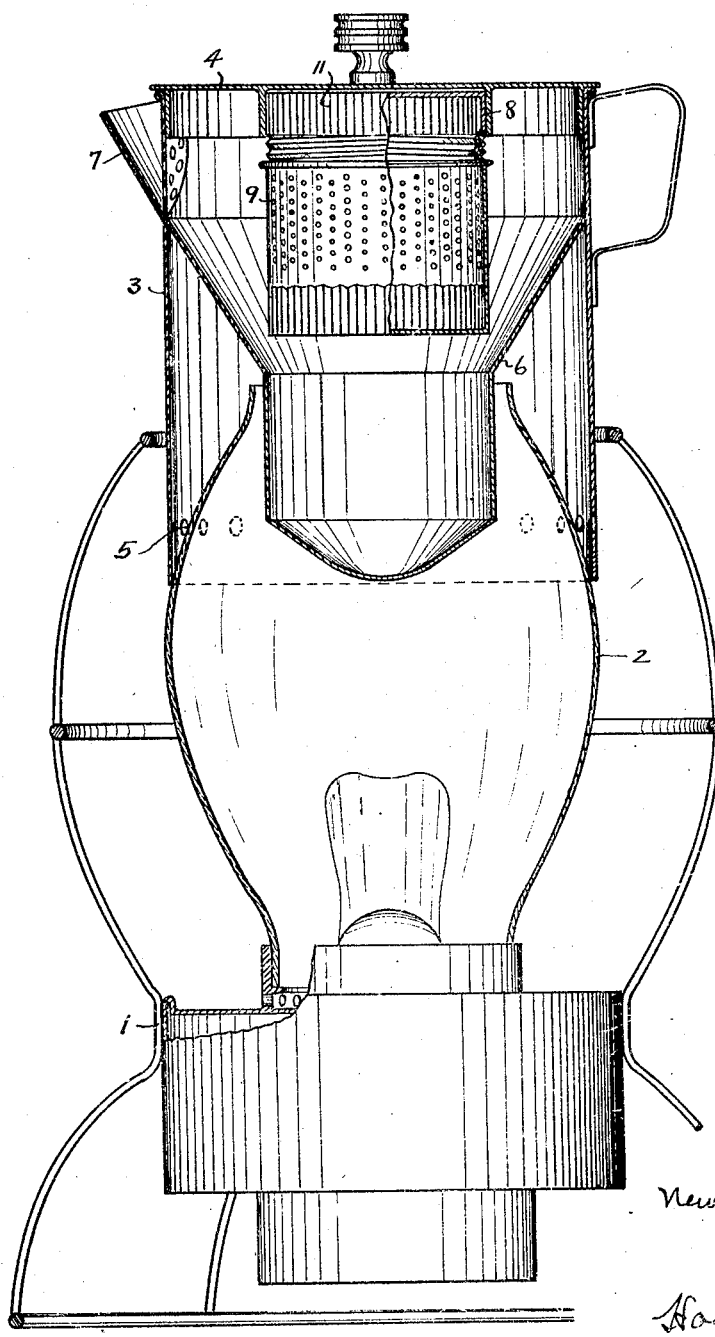

1,476,959

UNITED STATES PATENT OFFICE.

NEWTON O. DUNCAN, OF KINGSVILLE, TEXAS.

PERCOLATOR.

Application filed April 17, 1923. Serial No. 632,765.

*To all whom it may concern:*

Be it known that I, NEWTON O. DUNCAN, citizen of the United States, residing at Kingsville, in the county of Kleberg and State of Texas, have invented certain new and useful Improvements in Percolators, of which the following is a specification.

This invention relates to new and useful improvements in a percolator.

One object of the invention is to provide a percolator for making coffee and similar drinks, said percolator being specially adapted for use by railroad and other laborers, and night watchmen, and the like, for the reason that it is so formed that an ordinary lantern may be used to provide heat for percolating the drink.

Another object of the invention is to provide a percolator of the character described which is of simple construction and may be cheaply manufactured, conveniently used, and readily kept in repair.

With the above and other objects in view the invention has particular relation to certain novel features of construction, arrangement of parts, and use, an example of which is given in this specification and illustrated in the accompanying drawings, wherein:—

The figure shows a vertical sectional view of the percolator mounted upon a lantern.

In the drawings the numeral 1 designates the lantern as a whole which is conventional form, and which has the ordinary glass globe 2. The numeral 3 designates the body of the percolator which is preferably cylindrical in form and forms an outside apron around the globe 2 and which has the removable top 4, and whose lower end is open and provided with an annular row of perforations 5. Within this body there is a substantially funnel shaped container 6 formed of sheet metal whose margin is soldered or otherwise secured to the body 3, and the lower end of this container is reduced and spaced from the body 3, and of a size to fit within the upper end of the lantern globe 2. The numeral 7 designates a spout which leads from the interior of the percolator. The top 4 has a depending annular flange 8 and there is a perforated container 9 provided to contain the ground coffee. This container has a screw cap 11 adapted to be screwed thereon and to fit within said flange 8. The container 9 is thereby held suspended within the percolator. The percolator may be mounted on the globe of the lantern as shown and the heat generated by the flame of the lantern will be sufficient to boil the water in making the drink. When mounted on the lantern globe the lower end of the body 3 rests on said globe and the reduced part of the container 6 is spaced from the upper end of the globe to permit circulation of air up through the globe and then down and up through the perforations 5.

What I claim is:—

1. A percolator including a container whose lower end is contracted, an outside depending apron spaced from said container at its lower end and fastened to the container at its upper end.

2. A percolator including a container whose lower end is contracted, an outside depending apron spaced from said container at its lower end and fastened to the container at its upper end, the free end of said apron being perforated.

3. A percolator including a container whose lower end is contracted, an outside depending apron spaced from said container at its lower end and fastened to the container at its upper end, a cover for said container and a depending detachable foraminated receptacle carried by the cover.

4. A percolator including a container whose lower end is contracted, an outside depending apron to the upper end of which the container is attached, the lower end of the apron being spaced from the container, a cover for the container, and a foraminated receptacle carried by the cover.

In testimony whereof I have signed my name to this specification in the presence of two subscribing witnesses.

NEWTON O. DUNCAN.

Witnesses:
WM. A. CATHEY,
W. H. DUNLAY.